(12) United States Patent
Franke et al.

(10) Patent No.: US 9,991,079 B2
(45) Date of Patent: Jun. 5, 2018

(54) CIRCUIT BREAKER FOR AN ELECTRICAL CIRCUIT

(71) Applicant: Siemens Aktiengesellschaft, Munich (DE)

(72) Inventors: Henry Franke, Berlin (DE); Stefan Haebel, Oberasbach (DE); Rainer Huentemeier, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 212 days.

(21) Appl. No.: 15/146,998

(22) Filed: May 5, 2016

(65) Prior Publication Data

US 2016/0365214 A1 Dec. 15, 2016

(30) Foreign Application Priority Data

Jun. 9, 2015 (DE) ........................ 10 2015 210 479

(51) Int. Cl.
*H02H 3/00* (2006.01)
*H01H 71/74* (2006.01)
*H02H 3/08* (2006.01)
*H02H 3/20* (2006.01)
*H02H 1/00* (2006.01)

(52) U.S. Cl.
CPC ........ *H01H 71/7409* (2013.01); *H02H 3/006* (2013.01); *H02H 1/0092* (2013.01); *H02H 3/08* (2013.01); *H02H 3/20* (2013.01)

(58) Field of Classification Search
CPC .................................................. H01H 71/7409
See application file for complete search history.

(56) References Cited

U.S. PATENT DOCUMENTS

| 4,958,252 | A | * | 9/1990 | Murphy | ............... | H01H 1/0015 361/87 |
|---|---|---|---|---|---|---|
| 6,639,775 | B1 | * | 10/2003 | Musiol | ................ | H01H 71/123 361/93.3 |
| 6,836,396 | B1 | * | 12/2004 | Tignor | .................. | H02H 3/006 361/93.2 |
| 7,936,547 | B2 | * | 5/2011 | Dougherty | ......... | H01H 71/7409 361/115 |
| 2017/0062166 | A1 | * | 3/2017 | Lagree | .................. | H01H 71/10 |

* cited by examiner

*Primary Examiner* — Stephen W Jackson
(74) *Attorney, Agent, or Firm* — Harness, Dickey & Pierce, P.L.C.

(57) ABSTRACT

A circuit breaker is disclosed, including a series circuit including a measuring unit for determining the electrical current or/and voltage of the electrical circuit, an exchangeable trip unit for determining when current limit values are exceeded, and a switching unit for interrupting the electrical circuit if current limit values are exceeded. A switch characteristic module is connected to the trip unit and stores characteristic data relating to the circuit breaker. If a trip unit used is at least exchanged for a new trip unit, the characteristic data are transmitted to the new trip unit. Data specific to the trip unit are transmitted from the trip unit and are stored in the further memory area of the switch characteristic module. If a new trip unit is used, the characteristic data and the data specific to the trip unit are transmitted to the new trip unit.

15 Claims, 1 Drawing Sheet

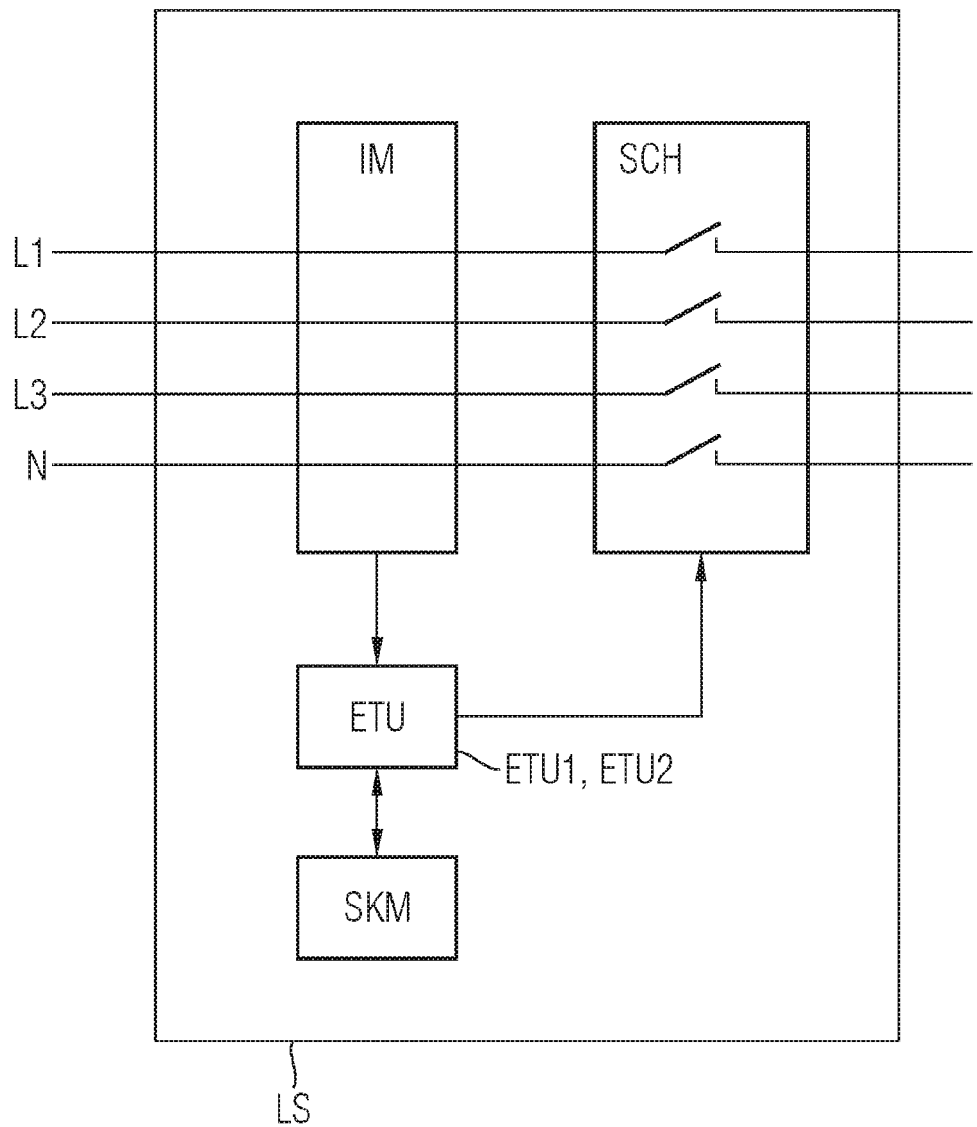

CIRCUIT BREAKER FOR AN ELECTRICAL CIRCUIT

PRIORITY STATEMENT

The present application hereby claims priority under 35 U.S.C. § 119 to German patent application number DE 102015210479.6 filed Jun. 9, 2015, the entire contents of which are hereby incorporated herein by reference.

FIELD

At least one embodiment of the invention relates to a circuit breaker for an electrical circuit according to the precharacterizing clause of patent claim 1.

BACKGROUND

Circuit breakers are an important part of the electrical infrastructure and of electrical systems and are used in any relatively large (low-voltage) energy distribution. Low-voltage energy distribution and low-voltage technology are used to mean electrical installations and circuits for voltages of up to 1000 volts AC or 1500 volts DC. In this case, circuit breakers such as, in particular, air circuit breakers or molded case (low-voltage) circuit breakers are used particularly often.

In the sense of the application, circuit breakers are used to mean, in particular, circuit breakers with an electronic trip unit.

The failure of a circuit breaker, in particular an air circuit breaker, may mean a large amount of financial damage. For example, production downtimes result, office buildings are without energy, elevators get stuck, ventilation systems fail and so on. The aim is therefore to provide a circuit breaker which has as little failure time as possible or no failure time. One measure for this are circuit breakers in which the electronic trip unit can be exchanged. That is to say, the trip unit can be exchanged by the operator or a service engineer in the event of an electronic fault.

The problem here is that system-specific protection parameters, so-called data specific to the trip unit, such as current limit values, tripping times, protection parameters, communication parameters, counter values, threshold values and the like, are adjusted to each trip unit of a circuit breaker. These must be individually adjusted to the device. If the trip unit is exchanged, they must be set again in the new trip unit in order to be compatible with the electrical system or the electrical circuit and its connected loads or further protective devices such as further downstream circuit breakers. In practice, this is associated with a considerable amount of effort.

Comprehensive paper documentation which is difficult to handle in practice has previously been kept and used for this purpose.

As a further alternative, systems were constructed in a redundant manner, with the result that it is possible to change over to the redundant system or installation in the event of a defect. However, this method is very cost-intensive and is therefore used only in high-availability systems.

SUMMARY

At least one embodiment of the present invention is directed to improving the exchange of a trip unit in a circuit breaker.

At least one embodiment of the present invention is directed to a circuit breaker.

At least one embodiment of the invention provides for the switch characteristic module, which contains characteristic data which relate to the circuit breaker and are stored in a first memory area for example, to have a further memory area. The trip unit and the switch characteristic module are configured in such a manner that data specific to the trip unit are transmitted from the trip unit used to the switch characteristic module and are stored there in the further memory area.

In the event of an exchange, that is to say use of a new trip unit in the circuit breaker, the characteristic data and the data specific to the trip unit are transmitted from the switch characteristic module to the new trip unit, with the result that they are available in the new trip unit and do not have to be input again. It is therefore possible to quickly exchange a trip unit in a circuit breaker, and the circuit breaker is operational again in a short time.

Advantageous configurations of the invention are specified in the claims.

BRIEF DESCRIPTION OF THE DRAWINGS

One example embodiment of the invention is explained in more detail below using the FIGURE, in which:

the FIGURE shows a block diagram of a circuit breaker according to an embodiment of the invention.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the FIGURES.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the FIGURE. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGURES. For example, two FIGURES shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the FIGURES. It will be understood that the spatially relative terms are intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

At least one embodiment of the invention provides for the switch characteristic module, which contains characteristic data which relate to the circuit breaker and are stored in a first memory area for example, to have a further memory area. The trip unit and the switch characteristic module are configured in such a manner that data specific to the trip unit are transmitted from the trip unit used to the switch characteristic module and are stored there in the further memory area.

In the event of an exchange, that is to say use of a new trip unit in the circuit breaker, the characteristic data and the data specific to the trip unit are transmitted from the switch characteristic module to the new trip unit, with the result that they are available in the new trip unit and do not have to be input again. It is therefore possible to quickly exchange a trip unit in a circuit breaker, and the circuit breaker is operational again in a short time.

In one advantageous embodiment of the invention, the trip unit and the switch characteristic module are configured in such a manner that the data specific to the trip unit are cyclically transmitted from the trip unit used to the switch characteristic module. This has the particular advantage that a copy of the up-to-date data which are specific to the trip unit is always stored in the switch characteristic module even if the trip unit suddenly fails.

In one advantageous embodiment of the invention, the switch characteristic module is configured in such a manner that the characteristic data relating to the circuit breaker are stored in a read-only manner. This has the particular advantage that the characteristic data which relate to the circuit breaker and firmly depend on the physical structure of the respective circuit breaker cannot be manipulated.

In one advantageous embodiment of the invention, the switch characteristic module is configured in such a manner that the further memory area is in the form of a non-volatile random access memory. A non-volatile memory is used to mean a memory which retains its memory contents even in the event of a power failure. This has the particular advantage that the data, in particular the data specific to the trip unit, are available even after a power failure.

In one advantageous embodiment of the invention, the trip unit is configured in such a manner that, after being transmitted to the trip unit, the data specific to the trip unit have to be confirmed before being (actively) used in the trip unit. This has the particular advantage that the data can be checked again before being used in the new trip unit. Certain data may also possibly be corrected if necessary.

In all embodiment, the exchange of a trip unit in a circuit breaker is improved.

The FIGURE shows a block diagram of a circuit breaker LS according to the invention for an electrical circuit or a circuit system, in the example for a three-phase system having the conductors L1, L2, L3 and N which are connected to the circuit breaker LS and whose current flows through the circuit breaker LS. A measuring unit IM for determining measured values of the electrical circuit, such as of the electrical current or/and alternatively also of the voltage of the electrical circuit or of the electrical currents or voltages of the circuit system, is inserted in the circuit breaker LS. The measuring unit IM is connected to an electronic trip unit ETU which determines when measured values, such as current or/and voltage measured values, are exceeded; that is to say, measured values, such as current or/and voltage measured values exceed stipulated limit values, such as current limit values or/and voltage limit values or/and their mathematical links or/and mathematical links to the time. The electronic trip unit IM is connected to a switching unit SCH for interrupting the electrical current of the electrical circuit or circuit system. If the electronic trip unit ETU detects that measured values are exceeded, that is to say the measured values or variables derived from the measured values exceed limit values, a signal is transmitted to the switching unit SCH which then interrupts the electrical circuit, for example by opening switching contacts of the electrical circuit.

The electronic trip unit ETU is connected to a switch characteristic module SKM which usually has only switch-specific characteristic data which usually relate to the physical configuration or hardware of the circuit breaker, such as maximum rated current, switching capacity, short-term current carrying capacity, number of poles or size. For this purpose, the switch characteristic module SKM has, for example, a first memory area in which these characteristic data are stored. If a new electronic trip unit ETU2 is used in the event of an exchange, for example on account of a defect, these data specific to the circuit breaker, that is to say the so-called characteristic data, are transmitted to the new electronic trip unit ETU2. Use-specific adjustments to the circuit breaker, that is to say data specific to the trip unit, such as adjustment parameters for the overload, short-circuit and ground fault protection, current, voltage, frequency and power limit values for messages or else for tripping the circuit breaker, addresses of the communication interfaces or else information relating to the location of the system, must be manually input.

An embodiment of the invention now provides for the switch characteristic module SKM to have a further memory area which is preferably in the form of a non-volatile random access memory, for example by means of EEPROMs or flash memories, which stores data specific to the trip unit. For this purpose, these data are transmitted from the trip unit ETU to the switch characteristic module SKM and are stored there. The transmission can be carried out manually, for example by initiating a corresponding write operation at the trip unit ETU, for example by means of a switch or by outputting a corresponding command. Alternatively, the write operation can also be carried out automatically after corresponding parameters specific to the trip unit have been input or changed. Furthermore, the write operation can also be carried out cyclically, that is to say at regular intervals, in which the up-to-date data relating to the trip unit ETU1 are thus protected.

If the existing or used trip unit ETU1 is exchanged, for example in the event of a fault, for a new trip unit ETU2, the data specific to the trip unit are transmitted from the switch characteristic module to the new trip unit ETU2. This can be carried out together with the characteristic data or in succession by virtue of the characteristic data first being transmitted and then the data specific to the trip unit being transmitted, for example.

The operation of transmitting the data can be carried out automatically, for example by detecting a new trip unit in the circuit breaker. Alternatively, it can also be initiated manually, for example by means of a corresponding switch on the circuit breaker LS or the operating unit or the trip unit, depending on the configuration of the circuit breaker LS. If the data have been transmitted, the data can also be confirmed before they are used in the trip unit.

The first memory area and the further memory area may be in the form of separate memories and in the form of one memory, for example. Each design is conceivable here. The important factor is that data specific to the trip unit are stored in a further memory area, for example a further memory or area in the existing memory. The design of the first memory area for the characteristic data, for example, is of secondary importance here.

An embodiment of the invention is explained again in other words below.

Parameters/data specific to the circuit breaker device (protection, communication, counter, threshold values, etc.) are intended to be redundantly stored in a part of the circuit breaker which is not exchanged by the operator. The internal switch characteristic module SKM of the circuit breaker LS is intended to be used for this purpose.

The device-specific parameters/data (protection, communication, counter, threshold values, etc.) are cyclically copied from the trip unit ETU to the switch characteristic module SKM.

If a new electronic trip unit ETU2 is installed, this can be detected and the device-specific parameters/data (protection, communication, counter, threshold values, etc.) can be read in from the switch characteristic module SKM. The operator or service engineer can now check the data for completeness and can possibly confirm the transfer.

As a result of the redundant storage of the data specific to the trip unit, in addition to the characteristic data, in the circuit breaker LS, the data are always available. A defective trip unit ETU1 can therefore always easily be exchanged in a short time, for example within a few minutes, using the up-to-date parameters/data. This "plug and play solution" does not presuppose any previous operator activity and can also be carried out without device-specific prior knowledge or training.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, etc. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A circuit breaker for protecting an electrical circuit, including a series circuit, comprising:
   a measuring unit to determine measured values of the electrical circuit;
   an exchangeable trip unit to determine when limit values of the measured values are exceeded;
   a switching unit to interrupt the electrical circuit, being configured to interrupt the electrical circuit if limit values are exceeded; and
   a switch characteristic module, connected to the trip unit, to store characteristic data relating to the circuit breaker in a first memory area, the trip unit and the switch characteristic module being configured to, upon the trip unit being at least exchanged for a new trip unit, transmit the characteristic data relating to the circuit breaker to the new trip unit, the switch characteristic module including a further memory area, and the trip unit and the switch characteristic module being configured such that data specific to the trip unit are transmitted from the trip unit to the switch characteristic module and are stored in the further memory area, and upon the new trip unit being used, the characteristic data and the data specific to the trip unit are transmitted from the switch characteristic module to the new trip unit.

2. The circuit breaker of claim 1, wherein the trip unit and the switch characteristic module are configured such that the data specific to the trip unit are cyclically transmitted from the trip unit to the switch characteristic module.

3. The circuit breaker of claim 1, wherein the switch characteristic module is configured to store the characteristic data relating to the circuit breaker in a read-only manner.

4. The circuit breaker of claim 1, wherein the switch characteristic module is configured such that the further memory area is in the form of a non-volatile random access memory.

5. The circuit breaker of claim 1, wherein the trip unit is configured such that, after being transmitted to the trip unit, the data specific to the trip unit are confirmed before being used in the trip unit.

6. The circuit breaker of claim 2, wherein the switch characteristic module is configured to store the characteristic data relating to the circuit breaker in a read-only manner.

7. The circuit breaker of claim 2, wherein the switch characteristic module is configured such that the further memory area is in the form of a non-volatile random access memory.

8. The circuit breaker of claim 3, wherein the switch characteristic module is configured such that the further memory area is in the form of a non-volatile random access memory.

9. The circuit breaker of claim 1, wherein the new trip unit is configured such that, after being transmitted to the new trip unit, the data specific to the new trip unit are confirmed before being used in the new trip unit.

10. The circuit breaker of claim 2, wherein the trip unit is configured such that, after being transmitted to the trip unit, the data specific to the trip unit are confirmed before being used in the trip unit.

11. The circuit breaker of claim 2, wherein the new trip unit is configured such that, after being transmitted to the new trip unit, the data specific to the new trip unit are confirmed before being used in the new trip unit.

12. The circuit breaker of claim 3, wherein the trip unit is configured such that, after being transmitted to the trip unit, the data specific to the trip unit are confirmed before being used in the trip unit.

13. The circuit breaker of claim 3, wherein the new trip unit is configured such that, after being transmitted to the new trip unit, the data specific to the new trip unit are confirmed before being used in the new trip unit.

14. The circuit breaker of claim 8, wherein the trip unit is configured such that, after being transmitted to the trip unit, the data specific to the trip unit are confirmed before being used in the trip unit.

15. The circuit breaker of claim 8, wherein the new trip unit is configured such that, after being transmitted to the new trip unit, the data specific to the new trip unit are confirmed before being used in the new trip unit.

* * * * *